UNITED STATES PATENT OFFICE.

ALBERT MUNSCHE, OF ALTONA, GERMANY.

MANUFACTURE OF MALT-WINES.

SPECIFICATION forming part of Letters Patent No. 612,746, dated October 18, 1898.

Application filed February 16, 1898. Serial No. 670,571. (No specimens.)

*To all whom it may concern:*

Be it known that I, ALBERT MUNSCHE, a subject of the King of Prussia, Emperor of Germany, residing at Altona, in the Kingdom of Prussia, Germany, have invented certain new and useful Improvements in the Manufacture of Malt-Wines, (for which I have applied for a patent in Germany, which application is dated March 10, 1897,) of which the following is a specification.

The malt-wines produced according to my process are pure products of fermentation. Additions such as are made by Jacquemin (English Patent No. 9,363, dated July 1, 1887) to his barley and other corn wines are not made in my process. In order to give a certain degree of acidity to his product, Jacquemin boils the cane-sugar to be added to the malt-wort (by which means an inversion of the sugar takes place at the same time) with tartaric acid or cream of tartar. He thus uses an organic acid which is not obtained from a constituent of the malt-wort. In my process, on the other hand, the inversion of the sugar is effected by lactic fermentation. Moreover, in my process the additions of coloring substances and fruit extracts as used by Jacquemin for his malt-wines are excluded. My process differs from Sauer's process (United States Patent No. 576,510, dated February 2, 1897, which, like mine, excludes additions of any kind) in the method of carrying out the several operations as well as in the nature of the fermentation hereinafter explained and in the method of giving the flavor. The differences will be hereinafter further set forth.

With regard to the product of my process it may be mentioned that it resembles the known sweet wines, Tokay wine, sherry, port-wine, &c., according to the nature of the barm employed, and it differs from the so-called "Malton" wines, first, in its slight percentage of dextrine, and, secondly, in its greater percentage of flavoring substances.

A characteristic group of constituents of grape-wines are the flavoring substances. According to the experiments of Muller, Thorgan, and Georges Jacquemin, the formation of these flavoring substances is not exclusively dependent upon the wine-barm of the fermented must; but a portion of these substances is already contained in the vine and passes from it into the grapes, and thus into the finished drink. These flavoring substances are ether-like bodies, which are termed "fruit-ethers." Such substances do not exist in malt. Now as additions of fruit-ethers of any kind whatever are excluded in my process, the flavoring substances forming rather a part of the malt-wort, I have tried the use of barm-forming fruit-ether and have thus attained the desired end. These barms possess the property of producing, instead of alcohol, great quantities of fruit-ether in the malt-wort. (*Betriebskontrolle in den Gahrungsgewerben,* Berlin, edition of Paul Parey, page 216, &c.) The characteristic properties of the kind of barm used for the production of the flavor give rise to the different aromas.

The percentage of flavoring substances produced naturally gives a distinct wine aroma to my malt-wine, which is free from the taste of malt and renders it a nerve-strengthening drink, which, moreover, in consequence of its great proportion of malt extracts, is a nourishing and strengthening agent for invalids and persons in a convalescent state.

In order to carry out my process, the following operations are necessary: first, the cultivation of barms; second, the preparation and inversion of the cane-sugar solution to be added to the malt-wort; third, the production and treatment of the malt-wort; fourth, the flavoring of the malt-wort mixed with inverted sugar; fifth, the fermentation of the malt-wort by means of cultivated wine-barms added at intervals; sixth, the storage of the new wine.

In the production of a malt-wort for the cultivation of the barms I mix one hundred and fifty kilograms of ground kiln-dried malt in a copper or wooden vat of about six hundred liters capacity with four hundred and fifty liters of water at a temperature of 30° centigrade, an agitator working therein at the same time. After two hours the mixture is brought to a temperature of 60° centigrade, at which temperature the mash should be left for two hours for the saccharifying process. After this the mixture is raised to the boiling-point, and the mash in a saccharified condition is pressed out by means of a press similar to that used in the manufacture of fruit or currant wines. This expressed malt-wort is transferred to a suitable vessel, where it is maintained in a sterilized condition.

Now for the cultivation of barms a kind of grape is chosen according as the character of Tokay, sherry, or port wine is desired and is crushed and the expressed must is allowed to ferment (in a small sterilized glass vessel closed with cotton wool in connection with a thermostat) at 30° centigrade. A small quantity of the fermenting must is then taken and a culture of the barm-cells is carried on according to one of the known methods, (Hansen's method of cultivation with a solid nourishing medium or Lindner's drop method, *Betriebskontrolle in den Gahrungsgewerben*, page 69.) This culture is transferred into sterilized tubes. When a sufficient quantity of the barm has formed upon the gelatin, a small portion of this barm is transferred by means of a platinum wire into a Pasteur flask of one liter capacity about three-quarters full of the sweet malt-wort obtained as above described. After two days a sufficient quantity of barm forms in the Pasteur flask, and this is further cultivated in a copper flask containing from six to eight liters of the above-mentioned wort. To this wort, when in complete fermentation, fifty liters of fresh wort are added, and with these the so-called "sour barm-wort," the production of which is described below. In order to increase the growth of the barm, it is advisable to periodically expose the worts to sterilized air. The temperature of fermentation is about 50° centigrade.

In carrying out my fermentation process the preparation of malt-wine barm in lactic acidulated malt-wort is necessary for the production of a strongly-developed sour-wine barm. This end is obtained by the process of acidifying with lactic acid the "barm-wort," which may be so called as distinguished from the "great" or "principal" wort. The preparation of this barm-wort is effected in the following manner: One hundred and fifty kilograms of ground malt are mixed in the same vat which was used for the production of the sweet malt-wort with the same quantity of water (four hundred and fifty liters) and then raised to a temperature of 70° centigrade by means of steam with agitation for about four hours. The mash is maintained at this temperature until completely saccharified and is then pressed out. The wort so obtained is transferred to a second vat of the same size and brought to a specific gravity of 26° to 30° Ball. by adding a solution of the finest quality of cane-sugar and is left to itself at a temperature of about 55° centigrade. At this temperature a fermentation commences accompanied with the formation of lactic acid, whereby products of lactic fermentation in the form of small rods develop.

The object of rendering the barm-wort sour is threefold—first, because the lactic acid has a peptonizing effect upon the albuminous bodies of the malt, and thus encourages the nourishment of the barm; second, because the lactic acid hinders the appearance of micro-organisms of a harmful nature; third, because the barm thrives better in a sour medium than in a neutral.

When the desired degree of sourness (0.8 to 1 per cent. lactic acid) of the barm-wort has been obtained, which is usually the case after about eighteen to twenty-four hours, the barm-wort now in a sour state is cooled to about 15° to 18° centigrade by means of a cooling-coil placed therein and is mixed with the wine-barm in fifty liters of sterilized malt-wort. This I call "sour-wine barm." At the expiration of a fermentation of twelve to fourteen hours the barm is ripe—*i e.*, the increase in the bulk of the barm has attained its limit. During the fermentation a considerable increase of temperature has taken place. It should be maintained at a temperature not exceeding 32° by means of a cooler. A part of the "mature barm," as the sour fermented barm-wort is called, about forty or fifty liters, is put aside to serve as seed for the next preparation of barm. The remaining four hundred liters of mature sour fermented barm-wort is used for fermenting the sweet principal wort produced in the meantime.

The cultivation of fruit-ether barm is similar to that described above for the sour barm-wort. For the purpose of obtaining fruit-ether barm a glass bottle loosely closed is filled with green malt or with very moist dried malt and stored in a warm place. After a few days an intense smell of fruit-ether can be discerned. A small quantity of this malt is put into sterilized wort and is cultivated in the same manner as above described with reference to the wine-barms and the product is what I call "fruit-ether barm."

In the preparation and inversion of the cane-sugar solution to be added to the malt-wort I mix about six hundred kilograms of white cane-sugar with forty liters of water in a vat of about fifteen hundred liters capacity. The temperature is raised by means of direct steam to 50° to 60° centigrade during agitation. This sugar solution is mixed with fifty liters of sour malt-wort, and the liquid is maintained at a temperature of 50° to 60° centigrade for about fifteen to sixteen hours. For effecting complete inversion the liquid is afterward raised to the boiling-point. When malt extract instead of sugar or a mixture of malt extract and sugar is used, the same method is adopted.

For the production and treatment of the principal malt-wort I mix one thousand kilograms of ground kiln-dried malt in a mash tub or vat with three times as much water, and the mixture is gradually raised to a temperature of about 70° centigrade by means of steam. This operation occupies from eight to ten hours, and after this the separation of the wort is effected by straining and pressure. The liquids drawn off from the straining-vat are united with the expressed liquids and the inverted sour sugar before mentioned is added. The mixture obtained in this manner is kept at a temperature of from 70° to 75° centigrade for about one to two hours. It is then quickly cooled, preferably by means of a water-spraying cooler, to from 30° to 34° centigrade and is led by means of copper tubes to the fermenting-vat.

The fermenting vat or tub is cylindrical and has a capacity of from seven thousand to eight thousand liters. There is a cooling-coil in this vat, by the agency of which the temperature of the wort is regulated during the fermentation. Further, there is an air-feeding tube in the fermenting-vat, by which sterilized air can be injected during the fermentation, according to requirements. The flow of wort into the fermenting-vat is so regulated that the entire quantity will be in the vat within four or five hours. When the vat contains about five hundred liters of wort, the preparation of fruit-ether barm before described is introduced into the vat for the purpose of flavoring the malt-wort. At the commencement pure sterilized air is injected, by which means the fruit-ether barm is caused to produce a stronger flavor. As soon as the aroma formed by the fruit-ether barm is noticeable the entrance of sterilized air is diminished and ripe sour-wine barm is added (four hundred liters) earlier or later, according to the degree of flavor desired.

In the fermentation of the principal wort the temperature should be maintained at about 28° centigrade, because as soon as the barm begins to increase in bulk it will tend to rise in temperature.

After obtaining a certain percentage of alcohol the barm is exhausted, the cells shrink together, and the fermentation would cease if new fresh strongly-fermenting barm were not added in the form of sour wine barm. For this purpose new sour barm matter is cultivated in the manner already described. During the process of fermentation I make repeated additions of fresh barm to the fermenting wort, so that as soon as a certain percentage of sugar has been fermented the fermentation is kept going by the addition of mature barm.

The entire duration of the fermentation is from four to six weeks, according to the percentage of alcohol to be obtained. At the expiration of this time, or, indeed, before the expiration, additions of fruit-ether barm are made, according to requirements and according as a more or less strong flavor is desired, as in the cultivation of the barm-forming fruit-ethers above described. When the principal fermentation is finished, the new wine is separated from the remaining barm and may be further fermented, if desired. The new wine should be put into warm storage at a temperature of about 50° centigrade. After being stored for one month the albuminous bodies separated by the warmth are removed by filtration and the clear wine is stored cold, almost as low as zero. In this state a further separation takes place, which can be accelerated and completed by adding suitable quantities of tannin. The wine can be again filtered and stored in barrels in a cellar in the usual manner to ripen.

My process differs from that of the United States patent to Sauer, No. 576,510, of February 2, 1897, (in which the malt-wort is subjected to a lactic fermentation at about 50° centigrade for the purpose of obtaining an energetic fermentation of the barm to prevent auxiliary fermentation,) by the fact that the malt-wort is subjected to a sterilizing temperature of 70° to 75° centigrade, which is not injurious to the diastase and at which a lactic fermentation of the wort is excluded. A further difference consists in the nature of the fermentation. Whereas in the Patent No. 576,510 the fermentation is obtained by the successive addition of sugar at like intervals during the fermentation, (a process which is universally adopted in the manufacture of arrack in Batavia, and also in the preparation of alcohol in Belgium from molasses,) in my process of fermentation the entire quantity of sugar inverted by lactic fermentation is added to the malt-wort before the fermentation, and the fermentation is maintained by the repeated addition of strongly-fermenting wine-barm in the form of sour mature wine-barm, the production of which was explained above.

What I claim as my invention is—

1. A process for the manufacture of malt-wine, which consists in adding to malt-wort which has not undergone lactic-acid fermentation, a lactic-acid solution of sugar, subjecting the mixture to a temperature between 63° and 75° centigrade for the purpose of producing an aroma and higher alcoholic contents, and at the same time sterilizing the wort without materially interfering with the diastase, substantially as set forth.

2. A process for the manufacture of malt-wine, which consists in adding to malt-wort which has not undergone lactic-acid fermentation, a lactic-acid solution, subjecting the mixture to a temperture about 70° centigrade treating the product with mature sour-wine barm, and adding similar barm thereto from time to time during fermentation, for the purpose of obtaining a high percentage of alcohol, substantially as set forth.

3. A process for the manufacture of malt-wine, which consists in adding to malt-wort which has not undergone lactic-acid fermentation, a lactic-acid solution, subjecting the mixture to a temperature of about 70° centigrade, more or less, treating the product with mature sour-wine barm, adding similar barm thereto from time to time during fermentation, and adding fruit-ether barm during fermentation, substantially as set forth.

4. A process for the manufacture of malt-wine, which consists in adding to malt-wort which has not undergone lactic-acid fermentation, a lactic-acid solution, subjecting the mixture to a temperature within the limits of 70° to 75° centigrade, or a little lower, treating the product with mature sour-wine barm, adding similar barm thereto from time to time during fermentation, adding fruit-ether barm, after removal of the contained wine-barm, and finally storing the product at a high temperature but not exceeding 50° centigrade, substantially as set forth.

5. In a process for the manufacture of malt-wine, the step of fermenting a partially-fermented and sterilized wort by successive additions of mature sour-wine barm and fruit-ether barm, substantially as set forth.

6. In a process for the manufacture of malt-wine, the step of effecting fermentation by successive additions of mature sour-wine barm and fruit-ether barm, removing the barm residue, and finally storing the product at a high temperature not exceeding 50° centigrade, substantially as set forth.

In testimony whereof I have hereunto set my hand in the presence of two witnesses.

ALBERT MUNSCHE.

Witnesses:
GUSTAV WEBER,
AUGUST LÜHRS.